United States Patent [19]

Saito et al.

[11] Patent Number: 5,450,755
[45] Date of Patent: Sep. 19, 1995

[54] MECHANICAL SENSOR HAVING A U-SHAPED PLANAR COIL AND A MAGNETIC LAYER

[75] Inventors: Shinji Saito, Suita; Hiroyuki Hase, Kyoto, both of Japan

[73] Assignee: Matsushita Electric Industrial Co., Ltd., Osaka, Japan

[21] Appl. No.: 138,744

[22] Filed: Oct. 19, 1993

[30] Foreign Application Priority Data

Oct. 21, 1992 [JP] Japan .................. 4-282663

[51] Int. Cl.⁶ .......................... G01B 7/16; G01L 1/12
[52] U.S. Cl. ........................ 73/763; 73/760; 336/200
[58] Field of Search ............. 73/763, 760, 781, 855, 73/777, 779; 328/1

[56] References Cited

U.S. PATENT DOCUMENTS

| | | | |
|---|---|---|---|
| 4,494,100 | 1/1985 | Stengel et al. | 336/200 |
| 4,933,209 | 6/1990 | Anthony et al. | 427/116 |
| 5,070,317 | 12/1991 | Bhagat | 336/200 |
| 5,194,806 | 3/1993 | Obama | 324/209 |

FOREIGN PATENT DOCUMENTS

| | | | |
|---|---|---|---|
| 0329479 | 8/1989 | European Pat. Off. | |
| 4117878 | 12/1991 | Germany | |
| 0011101 | 1/1987 | Japan | 73/760 |
| 64-9330 | 1/1989 | Japan | |
| 64-74705 | 3/1989 | Japan | |
| 1-173702 | 7/1989 | Japan | |
| 0010233 | 1/1990 | Japan | 73/760 |
| 3-188607 | 8/1991 | Japan | |
| 3191802 | 8/1991 | Japan | 73/760 |
| 4233443 | 8/1992 | Japan | 73/760 |
| 4-368105 | 12/1992 | Japan | |

OTHER PUBLICATIONS

EPO Search Report (93117098.9) dated Dec. 28, 1994.
"Oil Pressure Sensor Using Amorphous Magnetic Alloy", *SAE Technical Paper Series 920700*, pp. 111–118 (1992).
R. E. Jones, Jr., "Analysis of the Efficiency and Inductance of Multiturn Thin Film Magnetic Recording Heads", *IEEE Transactions on Magnetics*, vol. MAG-14, No. 5, pp. 509–511 (Sep. 1978).
Kawabe, K. et al., "Planar Inductor", *IEEE Transactions on Magnetics*, vol. MAG-20, No. 5, pp. 1804–1806 (Sep. 1984).

*Primary Examiner*—Richard E. Chilcot, Jr.
*Assistant Examiner*—James M. Olsen
*Attorney, Agent, or Firm*—Ratner & Prestia

[57] ABSTRACT

A mechanical sensor is provided, which includes: a magnetic layer having permeability which is changed in accordance with stress generated therein; a coil having at least two terminals, allowing an electric current to flow therebetween to generate a magnetic flux, thereby magnetizing the magnetic layer; and a substrate integrally supporting the magnetic layer and the coil, wherein the coil is a planar coil including at least one winding, each winding having a U-shaped portion formed of a first conductive line portion, a second conductive line portion, and a connecting portion connecting the first and second conductive line portions, the first and second conductive line portions extending in a first direction, and impedance between the terminals is changed in accordance with a change of inductance caused by a change of the permeability of the magnetic layer.

13 Claims, 8 Drawing Sheets

MECHANICAL SENSOR HAVING A U-SHAPED PLANAR COIL AND A MAGNETIC LAYER

BACKGROUND OF THE INVENTION

1. Field of the Invention

The present invention relates to a mechanical sensor, and more particularly to a mechanical sensor capable of detecting with high sensitivity, stress or strains.

2. Description of the Related Art

In recent years, under the circumstances that electronic equipment is made smaller and thinner, there is a great demand for further minaturization of mechanical sensors used in electronic equipment. A mechanical sensor utilizing a stress-magnetic effect has been put into practical use (e.g., see SAE Technical Paper Series 920700). Such a mechanical sensor is formed of a cylinder, to which an amorphous magnetic ribbon having a positive magnetostriction constant adheres, and detects the change of the permeability of the amorphous magnetic ribbon due to the stress applied thereto, by using a solenoidal coil.

The above-mentioned conventional mechanical sensor has a coil made of a conductive line with a diameter of about 20 to 30 μm, wound in a solenoidal shape and a magnetic bulk having a thickness of about 20 to 30 μm.

The above-mentioned conventional mechanical sensor has the following problems: Since such a mechanical sensor has a solenoidal coil and a magnetic bulk, it is difficult to miniaturize and integrate the sensor. In addition, since the thickness of the magnetic layer is in the range of 20 to 30 μm, and the diameter of the conductive line is in the range of 20 to 30 μm, there is a limit to the frequency of the sensor.

An example of a planar mechanical sensor suitable for the miniaturization is a strain gauge using a metallic foil. The sensitivity of the strain gauge is one-thousandth or less of that of the mechanical sensor utilizing a stress-magnetic effect.

SUMMARY OF THE INVENTION

The mechanical sensor of this invention, includes:

a magnetic layer having permeability which is changed in accordance with stress generated therein;

a coil having at least two terminals, allowing an electric current to flow therebetween to generate a magnetic flux, thereby magnetizing the magnetic layer; and a substrate integrally supporting the magnetic layer and the coil, wherein the coil is a planar coil including at least one winding, each winding having a U-shaped portion formed of a first conductive line portion, a second conductive line portion, and a connecting portion connecting the first and second conductive line portions, the first and second conductive line portions extending in a first direction, and impedance between the terminals is changed in accordance with a change of inductance caused by a change of the permeability of the magnetic layer.

In one embodiment of the present invention, the coil is a planar coil including at least two windings, and a distance between conductive line portions in which an electric current flows in the same direction is smaller than a distance between conductive line portions in which an electric current flows in the opposite directions to each other.

In another embodiment of the present invention, the magnetic layer is magnetized substantially in a direction orthogonal to the first direction.

In still another embodiment of the present invention, the coil is formed on an insulator layer supported by the substrate.

In still another embodiment of the present invention, the magnetic layer is formed between the insulator layer and the substrate.

In still another embodiment of the present invention, the magnetic layer is formed on the coil with another insulator layer formed therebetween.

In still another embodiment of the present invention, the magnetic layer has a two-layered structure and sandwiches the coil.

According to another aspect of the present invention, a mechanical sensor includes:

a magnetic layer having permeability which is changed in accordance with stress generated therein;

a coil having at least two terminals, allowing an electric current to flow therebetween to generate a magnetic flux, thereby magnetizing the magnetic layer; and a substrate integrally supporting the magnetic layer and the coil, wherein the coil is a planar coil including at least one winding, each of the windings having a first U-shaped portion formed of a first conductive line portion, a second conductive line portion, and a connecting portion connecting the first and second conductive line portions, and having a second U-shaped portion formed of a third conductive line portion, a fourth conductive line portion, and a connecting portion connecting the third and fourth conductive line portions, the first, second, third, and fourth conductive line portions extending in a first direction; and wherein the first and second U-shaped portions are connected in series between the terminals, and impedance between the terminals is changed in accordance with a change of inductance caused by a change of the permeability of the magnetic layer.

In one embodiment of the present invention, the coil is a planar coil including at least two windings, and a distance between conductive line portions in which an electric current flows in the same direction is smaller than a distance between conductive line portions in which an electric current flows in the opposite directions to each other.

In another embodiment of the present invention, the magnetic layer is magnetized substantially in a direction orthogonal to the first direction.

In still another embodiment of the present invention, the coil is formed on an insulator layer supported by the substrate.

In still another embodiment of the present invention, the magnetic layer is formed between the insulator layer and the substrate.

In still another embodiment of the present invention, the magnetic layer is formed on the coil with another insulator layer formed therebetween.

In still another embodiment of the present invention, the magnetic layer has a two-layered structure and sandwiches the coil.

According to another aspect of the present invention, a mechanical sensor includes:

a magnetic layer having permeability which is changed in accordance with stress generated therein;

a coil having at least two terminals, allowing an electric current to flow therebetween to generate a magnetic flux, thereby magnetizing the magnetic layer; and a substrate integrally supporting the magnetic layer and the coil, wherein the coil is a solenoidal coil including at least one winding, each of the winding having a first conductive line portion, a second conductive line portion, and a connecting portion connecting the first and second conductive line portions, the first and second conductive line portions extending in the first direction, and impedance between the terminals is changed in accordance with a change of inductance caused by a change of the permeability of the magnetic layer.

Thus, the invention described herein makes possible the advantage of providing a mechanical sensor with high sensitivity capable of being made small, thin, and integrated.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the drawings.

EXAMPLE 1

Figure 1:
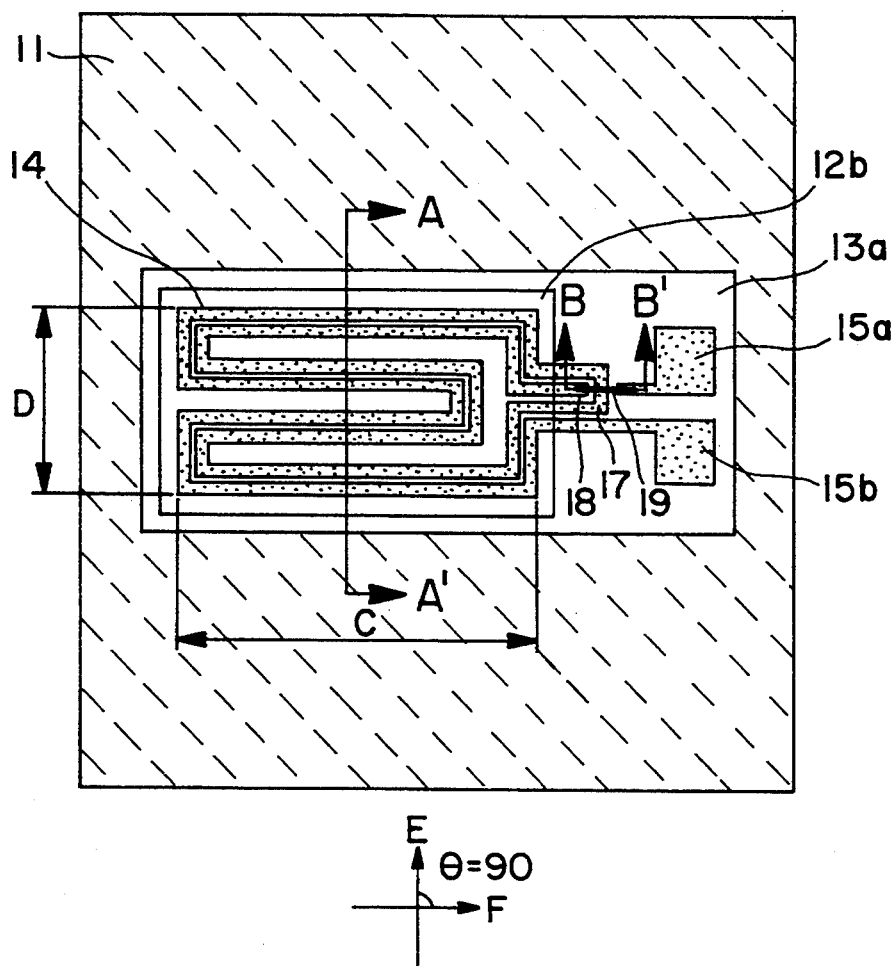
FIG. 1 is a partially perspective plan view showing a mechanical sensor of the present invention.
Figure 2:
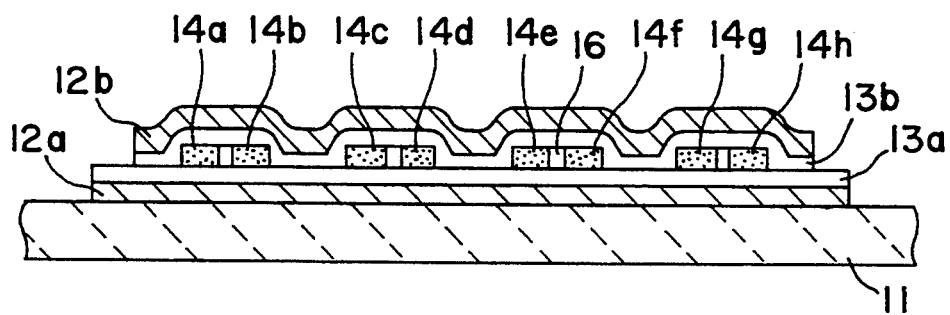
FIG. 2 is a cross-sectional view taken along a line A—A' of FIG. 1.
Figure 3:
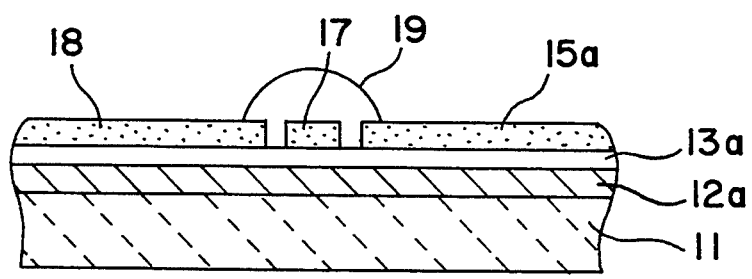
FIG. 3 is a cross-sectional view taken along a line B—B' of FIG. 1.

FIG. 1 is a plan view showing the structure of a mechanical sensor of the present invention. FIG. 2 is a cross-sectional view taken along a line A—A' of FIG. 1, and FIG. 3 is a cross-sectional view taken along a line B—B' of FIG. 1.

Hereinafter, the structure of the mechanical sensor of the present example will be described with reference to these figures.

Referring to FIG. 2, the cross-sectional structure of the mechanical sensor will be described. A magnetic layer 12a having a thickness of 5 $\mu$m is formed on a substrate 11 made of phosphor bronze, having a thickness of 0.5 mm. The substrate 11 can be made of any non-magnetic substance. The substrate 11 can be cylindrical, instead of being in a planar shape as shown in FIG. 2. The magnetic layer 12a is made of an Fe based amorphous film formed by a sputtering method and contains Fe, Cr, Si, and B. The relative permeability and magnetostriction constant of the magnetic layer 12a at a frequency of 1 MHz are 100 and +22 ppm, respectively.

On the magnetic layer 12a, an insulator layer 13a made of $SiO_2$, having a thickness of 2 $\mu$m is formed. On the insulator layer 13a, a planar coil 14 made of an aluminum film having a thickness of 5 $\mu$m and input-/output terminals 15a and 15b (not shown in FIG. 2) are formed.

The input/output terminals 15a and 15b are applied with a predetermined AC voltage, whereby an electric current flows through the planar coil 14. In the present specification, any each portion of the conductive line is sometimes called a line segment. The line segment is not limited to a linear shape, unless otherwise stated. In the planar coil 14, the minimum distance between conductive line portions (i.e., line segments), which are adjacent to each other and in which an electric current flows in the same direction, is 10 $\mu$m. More specifically, each distance between conductive line portions 14a and 14b, between conductive line portions 14c and 14d, between conductive line portions 14e and 14f, and between conductive line portions 14g and 14h is 10 $\mu$m. The minimum distance between the conductive line portions in which an electric current flows in the opposite directions to each other is 180 $\mu$m (see FIG. 1). More specifically, each distance between the conductive line portions 14b and 14c, between the conductive line portions 14d and 14e, and between the conductive line portions 14f and 14g is 180 $\mu$m. An insulator layer 16 having the same thickness as that of the planar coil 14 fills between the conductive line portions in which an electric current flow in the same direction.

On the insulator layer 13a, another insulator layer 13b is formed so as to cover the planar coil 14. The insulator layer 13b (thickness: 2 $\mu$m) is made of the same material as that of the insulator layer 13a. The insulator layer 13b fills gaps between any conductive line portions in which an electric current flows in the opposite directions to each other. On the insulator layer 13b, another magnetic layer 12b is formed. The magnetic layer 12b (thickness: 5 $\mu$m) is made of the same material as that of the magnetic layer 12a. In this way, in the present example, the planar coil 14 is sandwiched between the magnetic layers 12a and 12b.

Referring to FIG. 1, the planar structure of the mechanical sensor will be described. The substrate 11 has a rectangular shape with a longitudinal side of 30 mm and a vertical side of 15 mm. The planar coil 14 is formed in a rectangular region on the substrate 11, the rectangular region having a length C of 3000 $\mu$m in a first direction F and having a width D of 820 $\mu$m in a second direction E which is vertical to the first direction F. As shown in FIG. 1, the planar coil 14 of the present example has a basic structure including two windings on a plane (i.e., a double spinal structure). More specifically, the planar coil 14 has a basic structure in which each of the two windings of the planar coil 14 has first and second U-shaped portions connected in series. Each of the first U-shaped portions has first and second linear conductive line portions extending along the first direction F and a connecting portion connecting the first and second linear conductive lines.

Likewise, each of the second U-shaped portions has third and fourth linear conductive line portions extending along the first direction F and a connecting portion connecting the third and fourth linear conductive line portions. Alternatively, it is considered that each of the second and third linear conductive line portions and the connecting portions connecting each of the second and third linear conductive line portions form other U-shaped portions extending in the direction opposite to those of the first and second U-shaped portions.

Because of the above-mentioned structure, a planar coil can be obtained in which the total length of each linear conductive line portion extending in the first direction F is sufficiently larger than the total length of each linear conductive line portions extending in the second direction E. In addition, in a predetermined area, the total length of each linear conductive line portion extending in the first direction F is larger than that of the other structure. The number of windings can be one, or three or more, instead of two.

The shape of the planar coil 14 can be the same as those shown in FIGS. 9A–9C, 10A–10C, 11A and 11B. For simplicity, these figures show planar coils including one winding on a plane. However, as shown in FIG. 1, if wire bonding is used, a planar coil including two or more windings can be obtained. In addition, the number of U-shaped portions of each winding is not limited to those shown in these figures.

The magnetic layer 12b covers the main portion of the planar coil 14, as shown in FIG. 1. The planar coil 14 is provided with a projected portion 17 which is not covered with the magnetic layer 12b. Over the projected portion 17, an internal end 18 of the planar coil 14 is connected to the input/output terminal 15a with a gold wire 19 by wire bonding. Because of this, the planar coil 14 including two windings can be produced by a single photolithography process.

The planar coil 14 with the above-mentioned structure has the following two advantages.

Firstly, the magnetic layers 12a and 12b two-dimensionally formed can be effectively used as much as possible as a magnetic core of the planar coil 14. The following is generally known: Assuming that a certain distance (i.e., characteristic length) at which the magnetic flux of the magnetic layers 12a and 12b is attenuated to 1/e is $\lambda$, then $\lambda=(\mu_r \cdot g \cdot tm/2)$ (see, IEEE Tr. Magn. MAG14, pp. 509–511). Here, $\mu_r$ represents relative permeability of the magnetic layers 12a and 12b; g represents a gap thereof; and tm represents a layer thickness thereof. If the above-mentioned values are substituted in this equation, $\mu=32$ $\mu$m. That is to say, the magnetic flux is attenuated to 1/e at a distance of 30 $\mu$m from each conductive line portion. This characteristic length $\lambda$ is relatively small. The reason for this is that the magnetic layers 12a and 12b have a relatively small thickness (i.e., 5 $\mu$m) and have small relative permeability (i.e., 100). Since the characteristic length $\lambda$ is small, even though the planar coil 14 is formed in a certain limited area as shown in FIG. 1 (in which parts of the planar coil 14 are bent), the bent portions have little effect on the magnetic flux formed by the other portions of the planar coil 14. Thus, the magnetic layers 12a and 12b can be effectively used as much as possible as a magnetic core. It is preferred that the distance between the two adjacent conductive line portions in which an electric current flows in the opposite directions to each other is sufficiently larger than the characteristic length $\lambda$. The reason why the distance between the adjacent conductive line portions in which an electric current flows in the same direction is made as small as possible is to minimize the magnetic flux leaking between the conductive line portions. Since the distance between the conductive line portions in which an electric current flows in the same direction is 10 $\mu$m in this case, this value is sufficiently smaller than the characteristic length $\lambda$ and thus, less magnetic flux is leaked. Because of this, the inductance of the planar coil 14 is increased in proportion to nearly the square of the number of windings.

Secondly, in a case where the planar coil 14 is formed as shown in FIG. 1, the planar coil 14 can magnetize the magnetic layers 12a and 12b substantially in one direction as a whole. When stress is applied to the magnetic layers 12a and 12b having magnetostriction, magnetic anisotropy is induced in the stress direction due to magnetoelastic energy; as a result, the permeability in the stress direction is changed. Since the mechanical sensor of the present example detects the change of the permeability as the change of inductance, it is required that the magnetizing direction and the stress direction are aligned as much as possible. In a case where the conductive line and the magnetic layers 12a and 12b are formed on the substrate, the flat conductive line and the magnetic layers 12a and 12b are in parallel with each other. Because of this, the magnetizing direction is in parallel with the inner surface of the magnetic layers 12a and 12b and is orthogonal to the conductive line. In addition, since the stress generated in the magnetic layers 12a and 12b has the same magnitude as that generated on the surface of the substrate 11, it is considered that in the magnetic layers 12a and 12b, stress which is in parallel with the surface of the magnetic layers 12a and 12b is generated. Because of this, the planar coil 14 shown in FIG. 1 can selectively detect only the stress which is in substantially parallel with the direction E.

Hereinafter, the operation of the mechanical sensor of the present example will be described.

When the substrate 11 is pressurized, stress and strain having components in parallel with the direction E are generated on the surface of the substrate 11 (namely, the magnetic layers 12a and 12b). Assuming that the angle formed by each line segment of the planar coil 14 and the second direction E is represented by $\theta$, and the change of inductance of the planar coil 14 caused by the stress is represented by $\Delta L$. $\Delta L$ is in proportion to a component of the magnetizing direction of stress generated on the surface of the substrate 11. Because of this, $\Delta L$ is represented by the following Equation (1):

$$\Delta L = k_1 \times \delta \times (R \sin \theta + S \cos \theta) \quad (1)$$

where $k_1$ is a proportional constant, $\delta$ is stress, R is total length of the line segments of the planar coil 14 sandwiched between the magnetic layers 12a and 12b in the direction F, and S is total length of the line segments of the planar coil 14 thereof in the direction E.

It is understood from Equation (1) that $\Delta L$ becomes maximum in a case where R/S is large and $\theta$ is close to 90°. Thus, the planar coil 14 is placed so that R/S is large and $\theta$ is close to 90°. When R/S is large, cross talk (output component caused by the stress in the direction shifted by 90° from the direction of stress generated on the surface of the substrate 11) can be minimized.

The above-mentioned conditions can be satisfied in the structure of the present example. That is, as shown in FIG. 1, the planar coil 14 is bent in a rectangular wave shape and the length of the line segments extending in a certain direction is made larger than that of the other line segments extending in the other direction. In the present example, $\theta$ is set at 90°.

The distance between the adjacent conductive line portions in which an electric current flows in the opposite directions to each other is determined, considering the characteristic length $\lambda$. In a case where this distance is too large, R/S becomes small, increasing the area which is not magnetized. In contrast, in a case where this distance is too small, the inductance becomes small. In the present example, the distance between the adjacent conductive line portions in which an electric current flows in the opposite directions to each other is set at about 6 times the characteristic length $\lambda$. In the present example, R is 23000 $\mu$m and S is 1600 $\mu$m, so that R/S is 14.4.

The same effects as those obtained by using the planar coil 14 can also be obtained by using a meander coil (e.g., IEEE Tran. Magn. MAG-20, pp. 1804–1806, 1984). The meander coil has the following advantages: A step of connecting the internal end 18 to the input-/output terminal 15a is not required, and the resonance frequency is increased. However, since the number of windings of the meander coil is one, the inductance is relatively low.

In the case of another planar coil for zero correction, since $\Delta L$ becomes minimum at $\theta = 0$, the planar coil is placed on the substrate 11 so that $\theta$ becomes 0. In addition, since the minimum value of $\Delta L$ is in proportion to S, it is preferred that R/S is large.

EXAMPLE 2

Figure 4:
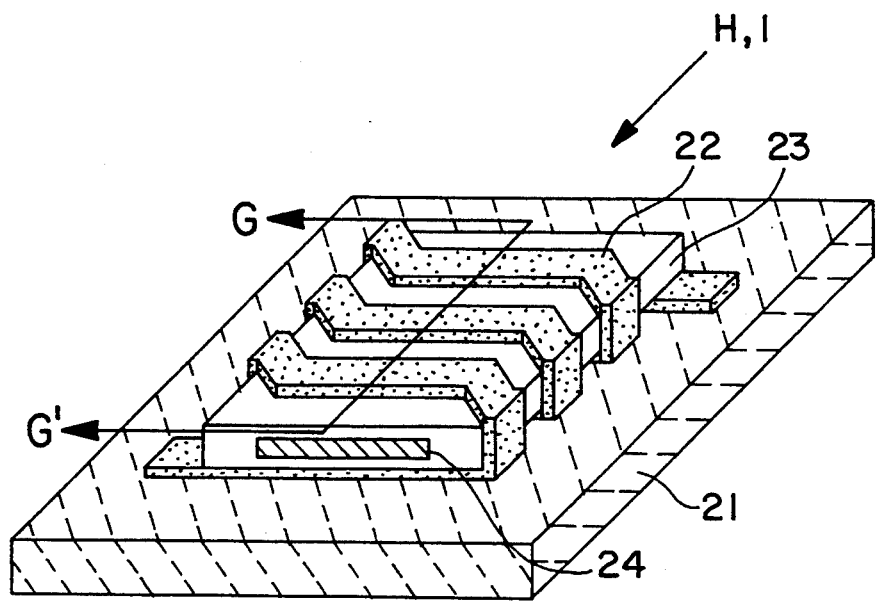
FIG. 4 is a perspective view showing another mechanical sensor of the present invention.
Figure 5:
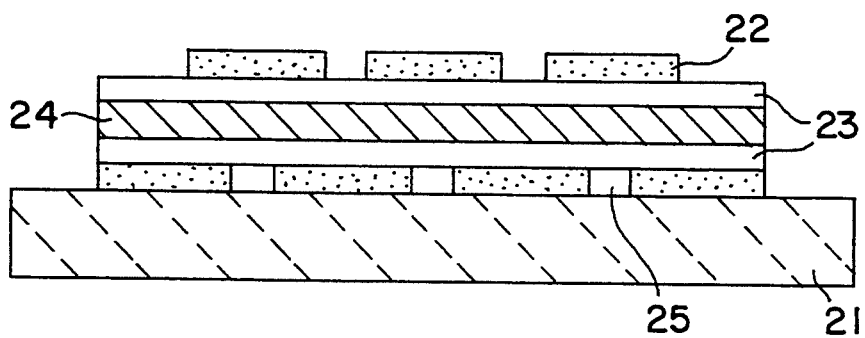
FIG. 5 is a cross-sectional view taken along a line G—G' of FIG. 4.

FIG. 4 is a perspective view showing the structure of another mechanical sensor according to the present invention. FIG. 5 is a cross-sectional view taken along a line G—G' of FIG. 4.

A substrate 21 has an insulating property at least on the surface thereof. The substrate 21 has a longitudinal side of 30 mm, a vertical side of 15 mm, and a thickness of 0.5 mm. On the substrate 21, a conductive line 22 made of an aluminum film with a thickness of 4 $\mu$m is formed. The conductive line 22 winds around a magnetic layer 24 covered with an insulator layer 23 in a solenoidal shape. Thus, the conductive line 22 forms a solenoidal coil. A thin portion of the insulator layer 23 has a thickness of 2 $\mu$m, and a thick portion thereof is 7 $\mu$m. As shown in FIG. 5, an insulator layer 25 is formed between the respective portions (which are in contact with the respective portions (which are in contact with the substrate 21) of the conductive line 22, the insulator layer 25 having the same thickness as that of the conductive line 22. The magnetic layer 24 is made of an Fe based amorphous film (thickness: 5 $\mu$m) formed by a sputtering method. The magnetic layer 24 has a rectangular shape (2000 $\mu$m × 3000 $\mu$m). The relative permeability and magnetostriction constant of the magnetic layer 24 at a frequency of 1 MHz are 100 and +22 ppm, respectively.

The portions of the conductive line 22 positioned above and below the magnetic layer 24 extend in the direction orthogonal to the longitudinal direction (hereinafter, this longitudinal direction is referred to as a direction H) of the magnetic layer 24. The reason for this is that the conductive line 22 magnetizes the magnetic layer 24 in the direction H. The portions (bent portions) of the conductive line 22 connecting the portions of the conductive line 22 positioned above the magnetic layer 24 with the portions of the conductive line 22 positioned below the magnetic layer 24 are not in parallel with the direction orthogonal to the direction H, as shown in FIG. 4. Thus, the bent portions magnetize the magnetic layer 24 in the direction shifted from the direction H. However, since the magnetic layer 24 is not present in the vicinity of the bent portions of the conductive line 22, the magnetic flux generated by the bent portions hardly influences the magnetic layer 24. In FIG. 4, for making it easy to see the conductive line 22, the insulator layer 25 is omitted.

Next, the operation of the mechanical sensor of the present example will be described.

Assuming that stress is generated in the longitudinal direction (I direction) of the substrate 21. In the present example, the conductive line 22 magnetizes the magnetic layer 24 in the direction H, so that the change of inductance due to the stress can be represented by the following Equation (2):

$$\Delta L = k_2 \times \delta \cos \theta \qquad (2)$$

where $\Delta L$ is the change of inductance, $k_2$ is a proportional constant, $\delta$ is applied stress, and $\theta$ is an angle formed by the directions H and I. As is apparent from Equation (2), when $\theta$ is 0°, $\Delta L$ becomes maximum; and when $\theta$ is 90°, $\Delta L$ becomes 0. In the present example, $\theta$ is set at 0°, so that $\Delta L$ becomes maximum. In addition, from Equation (2), $\Delta L$ is almost 0 in a case where $\theta$ is shifted by 90° in the present example. Thus, in this case, the cross talk becomes minimum.

In a case where a coil for zero correction is used, it is preferred that $\theta$ is set at 90°.

Even though the magnetic layer having magnetostriction extends to the vicinity of the bent portions of the conductive line 22, the mechanical sensor is still effective. In this case, $\Delta L$ and cross talk are somewhat increased.

EXAMPLE 3

Figure 6:
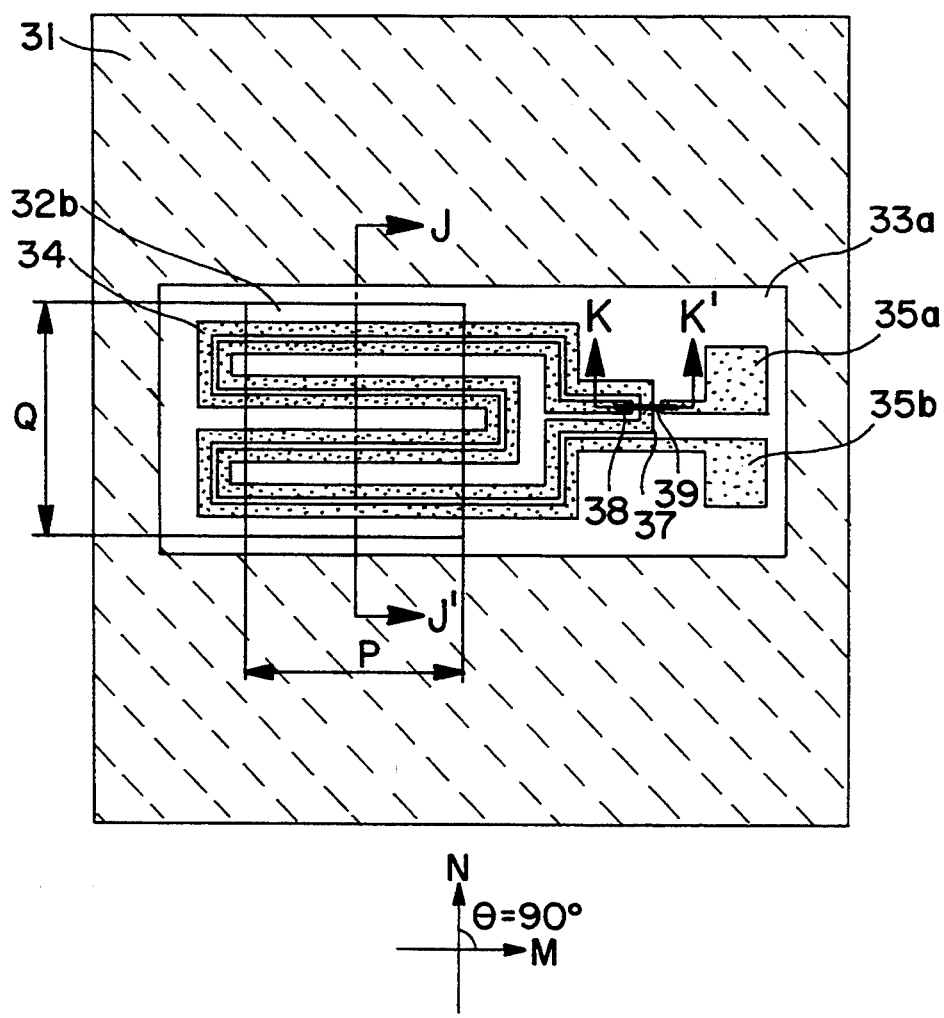
FIG. 6 is a partially perspective plan view showing still another mechanical sensor of the present invention.
Figure 7:
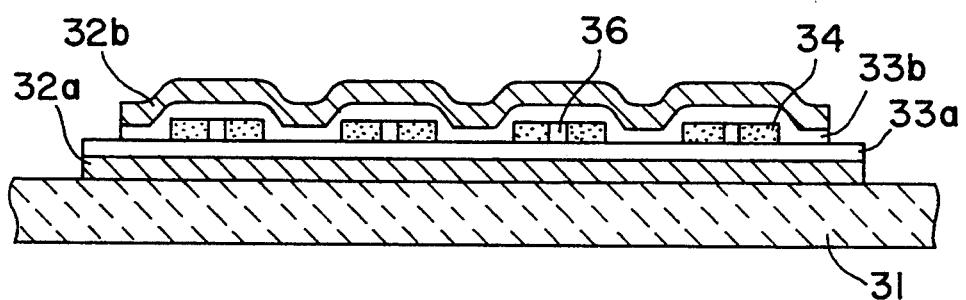
FIG. 7 is a cross-sectional view taken along a line J—J' of FIG. 6.
Figure 8:
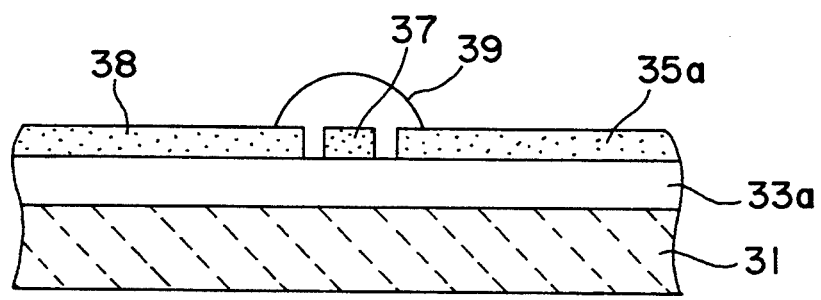
FIG. 8 is a cross-sectional view taken along a line K—K' of FIG. 6.
Figure 9A:
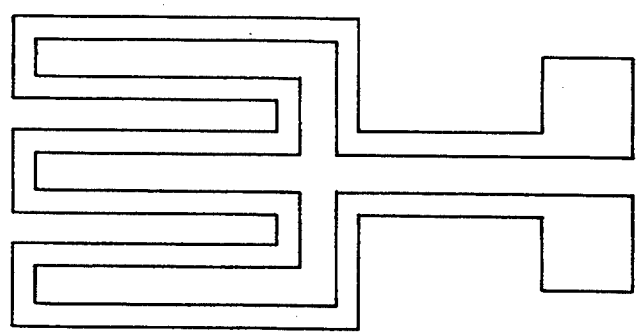
FIGS. 9A through 9C show examples of planar coils used in the mechanical sensors of the present invention.
Figure 9B:
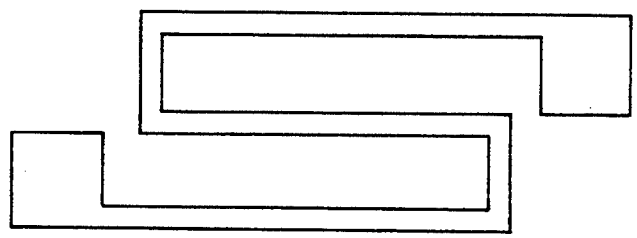
Figure 9C:
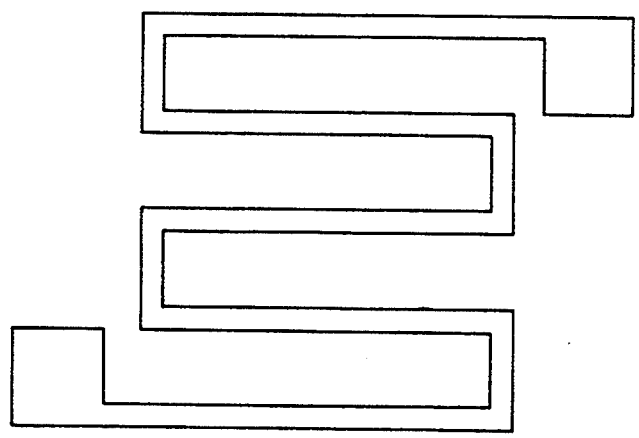
Figure 10A:
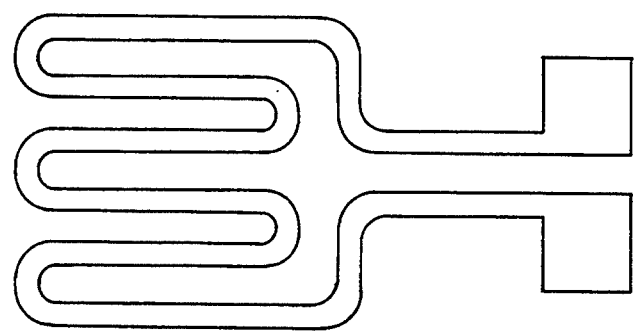
FIGS. 10A through 10C show examples of planar coils used in the mechanical sensors of the present invention.
Figure 10B:
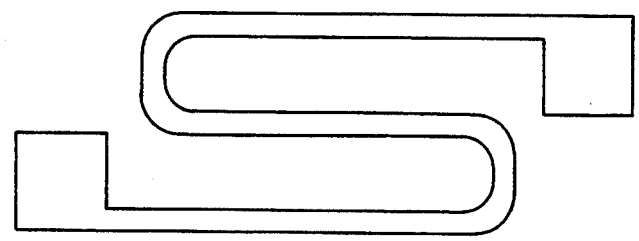
Figure 10C:
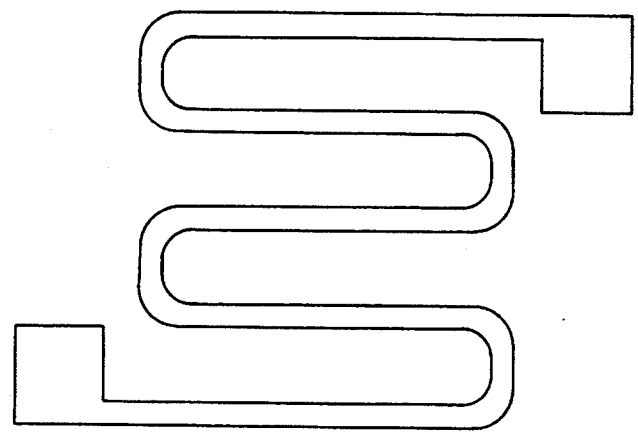
Figure 11A:
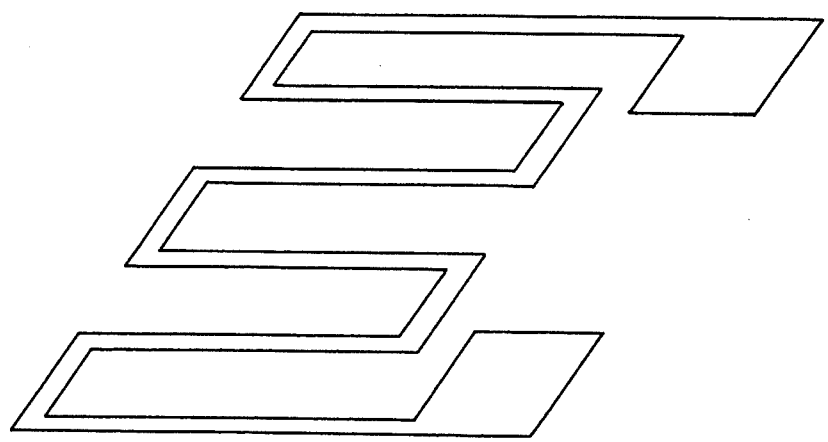
FIGS. 11A and 11B show examples of planar coils used in the mechanical sensors of the present invention.
Figure 11B:
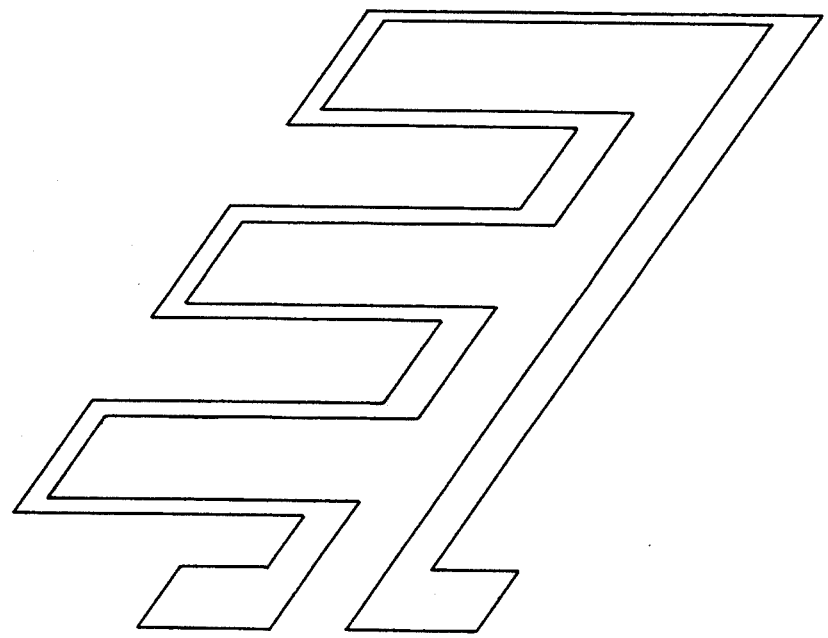

FIG. 6 is a plan view showing the structure of still another mechanical sensor of the present invention. FIG. 7 is a cross-sectional view taken along a line J—J' of FIG. 6, and FIG. 8 is a cross-sectional view taken along a line K—K' of FIG. 6.

A substrate 31 has a longitudinal side of 30 mm, a vertical side of 15 mm, and a thickness of 0.5 mm. On the substrate 31, magnetic layers 32a and 32b made of an Fe based amorphous film having a thickness of 5 $\mu$m are formed. The magnetic layers 32a and 32b are formed by, for example, a sputtering method. The relative permeability and magnetostriction constant of the magnetic layers 32a and 32b at a frequency of 1 MHz are 100 and +22 ppm, respectively. An insulator layer 33a is made of SiO$_2$ having a thickness of 2 $\mu$m, and an insulator layer 33b is made of SiO$_2$ having a thickness of 2 to 7 $\mu$m. On the insulator layer 33a, a planar coil 34 made of an aluminum film having a thickness of 5 $\mu$m and input/output terminals 35a and 35b are formed. The respective shapes of the planar coil 34 and the input-/output terminals 35a and 35b are the same as those of the planar coil 14 and the input/output terminals 15a and 15b as shown in FIG. 1. An insulator layer 36 having the same thickness as that of the planar coil 34 fills between the conductive line portions in which an electric current flows in the same direction. Reference numeral 37 denotes the same element as the projection 17 of the mechanical sensor in Example 1. An internal end 38 of the planar coil 34 is connected to the input/output terminal 35a via a gold wire 39.

For convenience, in FIG. 6, only the planar coil 34 can be seen below the magnetic layer 32b.

The structure of the mechanical sensor of the present example is basically the same as that of the mechanical sensor as shown in FIG. 1. The difference therebetween is that in the present example, the magnetic layers 32a and 32b are formed so that the magnetic layers 32a and 32b do not overlap the portions of the planar coil 34 extending in a vertical direction N thereof but overlap the portions of the planar coil 34 extending in a longitudinal direction M thereof. The size of the magnetic layers 32a and 32b is as follows: P is 2400 μm and Q is 1000 μm.

Next, the operation of the mechanical sensor of the present example will be described.

Assuming that the longitudinal direction of the substrate 31 is in the direction N, stress is applied in the direction N, an angle formed by the directions M and N is $\theta$, and the change of inductance is $\Delta L$. If $R=(2400\times8)/23000\approx0.8R$ and $S=0$ is substituted in Equation (1), $\Delta L$ can be represented by Equation (3):

$$\Delta L = k_1 \times \delta \times 0.8 \times R \sin \theta \qquad (3)$$

As is apparent from Equation (3), when $\theta$ is 90°, $\Delta L$ becomes maximum, and when $\theta$ is 0°, $\Delta L$ becomes 0. In the present example, $\theta$ is set at 90°.

Compared with Example 1, $\Delta L$ is smaller by about 20%. However, when $\theta$ is shifted by 90°, $\Delta L$ becomes 0, so that the cross talk becomes almost 0. In this respect, the mechanical sensor of the present example is more excellent than that of FIG. 1. In a case where a coil for zero correction is formed at $\theta=0$, the small cross talk has favorable effects.

In addition, the same structure as that of the present example can be realized by using a meander coil.

In Examples 1 to 3, an Fe based amorphous film having a positive magnetostriction constant, formed by a sputtering method is used as a magnetic layer having magnetostriction. However, any materials having magnetostriction can be used for a magnetic layer. For example, even a magnetic layer having negative magnetostriction can be used in the structures of the present invention.

Moreover, in Examples 1 to 3, only magnetic layers having magnetostriction are used. However, a magnetic layer having a magnetostriction of almost 0 and high relative permeability can be used as a part of the magnetic circuit.

According to the present invention, a small and thin mechanical sensor is provided. The mechanical sensor of the present invention effectively uses a magnetic layer which is thinner than the bulk, so that the mechanical sensor of the present invention has high sensitivity for detection irrespective of its thinness. Moreover, the mechanical sensor of the present invention can selectively detect the level of stress in a certain direction with high sensitivity, based on the anisotropy of the sensitivity for detection which does not depend upon the shape of the magnetic layer.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A mechanical sensor comprising:
   a magnetic layer having permeability which is changed in accordance with stress generated therein,
   a coil having at least two terminals, allowing an electric current to flow therebetween to generate a magnetic flux, thereby magnetizing the magnetic layer; and
   a substrate integrally supporting the magnetic layer and the coil,
   wherein the coil is a planar coil including at least one winding, each winding having a U-shaped portion formed of a first conductive line portion, a second conductive line portion, and a connecting portion connecting the first and second conductive line portions, the first and second conductive line portions extending in a first direction and magnetizing the magnetic layer in a direction which is substantially perpendicular to the first direction and is parallel to a surface of said magnetic layer, and an impedance between the terminals is changed in accordance with a change of inductance caused by a change of the permeability of the magnetic layer.

2. A mechanical sensor according to claim 1, wherein the coil is a planar coil including at least two windings, and a distance between conductive line portions in which an electric current flows in the same direction is smaller than a distance between conductive line portions in which an electric current flows in the opposite directions to each other.

3. A mechanical sensor according to claim 1, wherein the coil is formed on an insulator layer supported by the substrate.

4. A mechanical sensor according to claim 3, wherein the magnetic layer is formed between the insulator layer and the substrate.

5. A mechanical sensor according to claim 3, wherein the magnetic layer is formed on the coil with another insulator layer formed therebetween.

6. A mechanical sensor according to claim 1, wherein the magnetic layer has a two-layered structure and sandwiches the coil.

7. A mechanical sensor comprising:
   a magnetic layer having permeability which is changed in accordance with stress generated therein,
   a coil having at least two terminals, allowing an electric current to flow therebetween to generate a magnetic flux, thereby magnetizing the magnetic layer; and
   a substrate integrally supporting the magnetic layer and the coil,
   wherein the coil is a planar coil including at least one winding, each winding having a first U-shaped portion formed of a first conductive line portion, a second conductive line portion, and a connecting portion connecting the first and second conductive line portions, and having a second U-shaped portion formed of a third conductive line portion, a fourth conductive line portion, and a connecting portion connecting the third and fourth conductive line portions, the first, second, third, and fourth conductive line portions extending in a first direction and magnetizing the magnetic layer in a direction which is substantially perpendicular to the first direction and is parallel to a surface of said magnetic layer; and wherein the first and second U-shaped portions are connected in series between the terminals, and an impedance between the terminals is changed in accordance with a change of inductance caused by a change of the permeability of the magnetic layer.

8. A mechanical sensor according to claim 7, wherein the coil is a planar coil including at least two windings, and a distance between conductive line portions in which an electric current flows in the same direction is smaller than a distance between conductive line portions in which an electric current flows in the opposite directions to each other.

9. A mechanical sensor according to claim 7, wherein the coil is formed on an insulator layer supported by the substrate.

10. A mechanical sensor according to claim 9, wherein the magnetic layer is formed between the insulator layer and the substrate.

11. A mechanical sensor according to claim 9, wherein the magnetic layer is formed on the coil with another insulator layer formed therebetween.

12. A mechanical sensor according to claim 7, wherein the magnetic layer has a two-layered structure and sandwiches the coil.

13. A mechanical sensor comprising:

a magnetic layer having permeability which is changed in accordance with stress generated therein, a coil having at least two terminals, allowing an electric current to flow therebetween to generate a magnetic flux, thereby magnetizing the magnetic layer; and a substrate integrally supporting the magnetic layer and the coil, wherein the coil is a planar coil including at least one winding, each winding having a U-shaped portion formed of a first conductive line portion, a second conductive line portion, and a connecting portion connecting the first and second conductive line portions, the first and second conductive line portions extending in a first direction and magnetizing the magnetic layer in a direction which is substantially perpendicular to the first direction and is parallel to a surface of said magnetic layer, and an impedance between the terminals is changed in accordance with a change of inductance caused by a change of the permeability of the magnetic layer, and wherein said magnetic layer does not extend into said connecting portion regions.

* * * * *